United States Patent [19]

Calfo et al.

[11] 4,425,854
[45] Jan. 17, 1984

[54] MICRONIZED COAL BURNER FACILITY

[75] Inventors: Frederick D. Calfo, Elyria; Michael W. Lupton, Strongsville, both of Ohio

[73] Assignee: The United States of America as represented by the Administrator of the National Aeronautics and Space Administration, Washington, D.C.

[21] Appl. No.: 393,588

[22] Filed: Jun. 30, 1982

[51] Int. Cl.³ .................. F23C 1/10; F23C 1/12
[52] U.S. Cl. .................. 110/262; 110/186; 110/263; 110/265; 431/1
[58] Field of Search .......... 110/185, 186, 263, 347, 110/261, 262; 431/1, 158, 264, 265; 239/102, 124, 426, 434

[56] References Cited

U.S. PATENT DOCUMENTS

| | | | |
|---|---|---|---|
| 2,532,740 | 12/1950 | Speer | 110/261 |
| 4,081,233 | 3/1978 | Kitajima et al. | 431/1 |
| 4,103,827 | 8/1978 | Kumazawa | 239/434 |
| 4,344,402 | 8/1982 | Child et al. | 239/102 |

FOREIGN PATENT DOCUMENTS 2729476 1/1979 Fed. Rep. of Germany ...... 110/347

Primary Examiner—Henry C. Yuen
Assistant Examiner—Steven E. Warner
Attorney, Agent, or Firm—Norman T. Musial; John R. Manning; James A. Mackin

[57] ABSTRACT

It is an object of the invention to provide for a coal in oil mixture a combustor or burner system in which the ash resulting from burning the mixture is of submicron particle size.

The burner system comprises, as shown in FIGS. 1 and 2, a burner section (11), a flame exit nozzle (12), a fuel nozzle section (13) and an air tube (14) by which preheated air is directed into burner section (11). Regulated air pressure is delivered to a fuel nozzle (34) in nozzle section (13) through a line (9). Means (8),(16), and (17),(29),(6),(30) and (31) are provided for directing a mixture of coal particles and oil from a drum (15) to a nozzle (34) of FIG. 2 at a desired rate and pressure while a means (19) returns excess fuel to the fuel drum (15). Means (25) is provided for keeping the coal particles uniformly distributed in the coal in oil mixture in fuel drum (15). Means (29), (30), and (31) provide for stable fuel pressure supply from fuel pump (8) to fuel nozzle (34).

A chamber is provided in the nozzle body (35), as shown in FIG. 3, and nozzle (34) is threaded into the nozzle body (35) inwardly of an end wall (36). Fuel flows from chamber (37) through axial passageways (45) and then radially inwardly through fuel passageways (44). The fuel enters passageway (43) and is atomized by regulated air pressure passing therethrough and exiting at the nozzle orifice.

9 Claims, 4 Drawing Figures 4,425,854

MICRONIZED COAL BURNER FACILITY

ORIGIN OF THE INVENTION

The invention described herein was made by employees of the U.S. Government and may be manufactured or used by or for the Government without the payment of any royalties thereon or therefor.

TECHNICAL FIELD

This invention relates to burners of the type which may be used with boilers for generating steam or to drive a turbine. More particularly, the invention is concerned with a burner which uses a coal and oil (COM) mixture having a thick consistency.

Because of the energy crisis caused by the reduction in availability of crude oil beginning in 1973, there was a serious need for alternative energy schemes to reduce the dependence of the United States on foreign oil. One scheme which had been attempted in the past involves the use of coal particles in fuel oil (COM) with the coal and the mixture being as high as 50 weight percent. The use of COM has the advantage of reducing the amount of oil used while still allowing the COM to be handled and burned as a liquid.

In the past, most attempts to use COM has been with regard to its use in utility boilers and blast furnaces. However, because of the rapidly expanding use of gas turbines for applications such as electrical generation, it would be extremely advantageous to operate such turbines on COM. Attempts to operate gas turbines on powdered coal alone have been unsuccessful. Not only were there problems of handling and preparing the coal, but the ash from the burned coal particles caused unacceptable erosion of the turbine blades.

In order to successfully operate a gas turbine using COM, there are two primary conditions which must be met. Firstly, there must be adequate atomization of the COM and, secondly, minimization of coking of the burner. Meeting these conditions will only be achieved by clean burning and flame stability.

BACKGROUND ART

U.S. Pat. No. 2,965,312 to Hale discloses a gun for spraying refractory materials, insulation materials, mortars or other similar materials. A slurry is fed at an angle to the axis of a bore and injected through slots in the bore into an air stream which causes the slurry material to be shot against a surface which is desired to be coated.

U.S. Pat. No. 2,988,139 shows a spray device having a single convergent, divergent discharge nozzle with an annular slot to produce a coanda effect, the slot being formed in the convergent portion of the nozzle. The liquid to be sprayed is brought in through an injector or jet nozzle in the vicinity of the slot to effect an extremely intimate mixture of air and finely divided liquid particles. These particles are then discharged through the divergent portion of the discharge nozzle.

U.S. Pat. No. 3,341,124 to Barnes et al is directed to a method and apparatus for spraying liquids. A spray nozzle is provided in which a liquid and a gaseous fluid are separately directed to converge before exiting through an aperture to form a spray. Air flow is continuous through the aperture while the liquid flow is controlled by a metering needle.

U.S. Pat. No. 3,464,625 to Carlsson shows an apparatus for atomizing water. The apparatus comprises first and second venturi throats, the second throat being contiguous with a diverging passageway. Water is directed through the venturis while air is injected into the water in the annular space between the first and second venturis.

U.S. Pat. No. 3,963,182 to Rulseh shows a burner having a central fuel delivery pipe with an end nozzle from which fuel is sprayed at various angles. A first coaxial air delivery pipe of larger diameter than the fuel delivery pipe provides a thin sheath of air around the sprayed fuel to provide a fuel-rich mixture for combustion. A second air delivery disposed coaxially around the first air delivery pipe provides another sheath of air which is sufficient to complete stoichiometric combustion.

U.S. Pat. No. 4,224,158 to Molvar et al discloses a nozzle for aerating water. A stream of liquid is directed into a tube having a portion which converges. Air is injected at an angle to the stream of liquid as the liquid exits a tapered nozzle.

DISCLOSURE OF THE INVENTION

In accordance with the invention, a cylindrical combustor has a spray nozzle disposed coaxially at a first end while the other end has attached thereto an exit nozzle. The diameter of the exit nozzle first converges but then diverges in a direction away from the spray nozzle, thereby forming a throat or venturi.

The burner section has an inner wall which is separated from an outer wall. This arrangement reduces heat transfer from the combustion zone to provide more complete burning of the fuel.

The spray nozzle includes an axially centered passageway through which regulated air pressure is injected into the burner. A mixture of coal particles in oil (COM) is directed through a plurality of axial passageways to corresponding radial passageways which communicate with the central passageway. As the COM flows through the radial passageways into the central passageway, the regulated air pressure causes atomization of the COM.

The spray nozzle is supported in a nozzle body which includes passageways for air, for entrance of the fuel mixture and for exit of excessive fuel mixture. Preheated combustion air passes around the nozzle body and into the burner chamber.

Apparatus for mixing the coal particles with fuel oil and for pumping the COM mixture to the burner with the required pressure and back pressure relief as well as appratus for providing high pressure air and preheated combustion air, as previously described, are also provided.

BEST MODE FOR CARRYING OUT THE INVENTION

Figure 1:
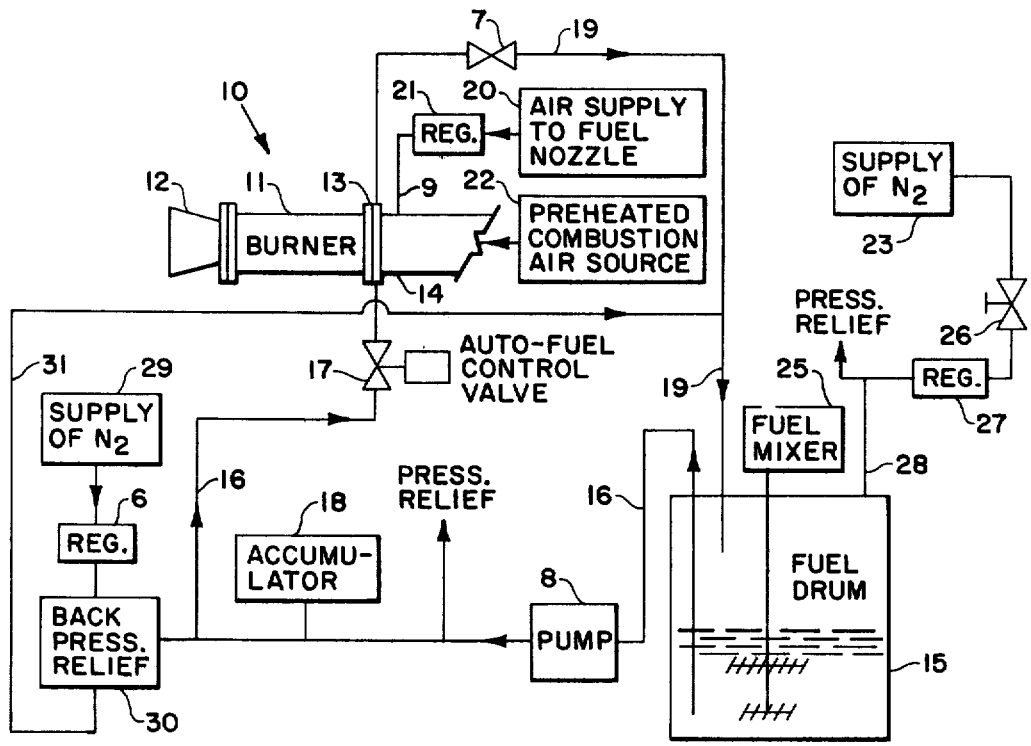
FIG. 1 is a schematic diagram of a system utilizing a coal particle and oil mixture, which mixture is burned in a turbine or boiler.

Referring now to FIG. 1, there is shown a burner unit 10 comprised of a burner section 11, a flame exit nozzle 12, nozzle body section 13, and a preheated combustion air supply tube 14. The COM is supplied from a fuel drum 15 through a supply line 16 and an automatic fuel control valve 17 to the nozzle section 13 of burner 10 by means of a pump 8 in the line 16.

Fuel from pump 8 also flows through a pressure relief regulator 30 and a line 31 to a fuel return line 19 connected between nozzle body section 13 and fuel drum 15 through a valve 7 or orifice which provides a pressure drop. Regulator 30 is a commercial item wherein a desired pressure is applied to one side of a diaphragm for control purposes.

In accordance with the present invention, nitrogen from a supply 29 is delivered through a pressure regulator 6 to the diaphragm of pressure relief regulator 30 at a pressure of approximately 60 psi gage pressure. This arrangement regulates the fuel pressure in line 16 at 60 psi gage pressure. The pressure drop caused by valve 17 reduces the fuel pressure so that the delivery pressure at the nozzle body 13 is about 15 psi gage pressure. To reduce pressure pulses in fuel line 16, an accumulator 18 is also connected in the line 16. The excess fuel not needed for combustion in the burner 11 is returned to the fuel drum 15 by means of the return line 19.

In order to atomize the fuel delivered to the nozzle section 13, regulated air pressure from a supply 20 is directed through a regulator 21 to the nozzle section 13 as will be described more fully with respect to FIGS. 2 and 3. To increase the efficiency of combustion in the burner section 11 and to reduce coking, high temperature air is passed from a preheated combustion air source 22 through the delivery tube 14 and the nozzle section 13 into the burner section 11.

In order to obtain complete burning of the COM mixture in burner section 11, it is necessary that the coal particles be uniformly distributed in the COM. To this end a fuel mixing device (25) drives mixing discs at various elevations in the COM mixture in the drum 15. Nitrogen from a source 23 may be directed by means of a valve 26, a regulator 27, and a line 28 to the interior of the fuel drum 15 above the fuel, thereby slightly pressurizing the drum 15 at around 1 psi gage pressure.

Figure 2:
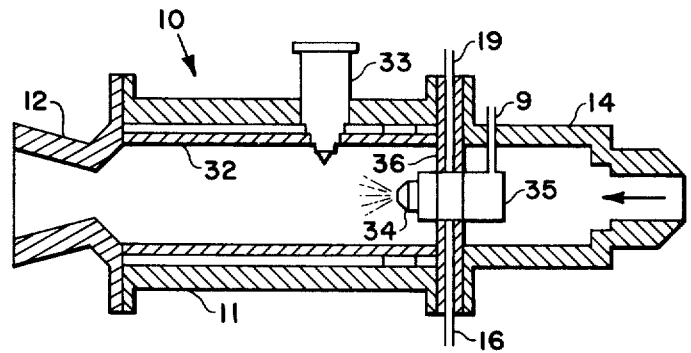
FIG. 2 is a longitudinal sectional view of the burner included in the system of FIG. 1.

The burner unit 10 of FIG. 1 is shown in longitudinal section in FIG. 2 and corresponding parts are identified by like numerals. As shown in FIG. 2, burner section 11 is provided with an inner wall 32 which is spaced inwardly of section 11 and extends from the flame exit nozzle 12 to the fuel nozzle end of section 11. A fuel spray nozzle 34 carried in a nozzle body 35 extends into the burner section 11 and is supported by a wall 36 between the preheated air tube 14 and the burner section 11. Wall 36 has large open areas. To ignite the fuel air mixture in the vicinity of the spray nozzle 34, an igniter 33 extends through the wall of burner section 11 and the inner wall 32.

In order to stabilize the combustion or burning of the fuel air mixture in burner section 11, the diameter of flame exit nozzle 12 converges from its juncture with section 11 to a substantially smaller diameter. The inner surface of exit nozzle 12 then diverges or increases in diameter in the direction away from the combustion chamber to form a throat in the nozzle. This particular arrangement establishes an impedance which stabilizes the combustion process. Combustion in burner section 11 is at about 1 psi.

Figure 3:
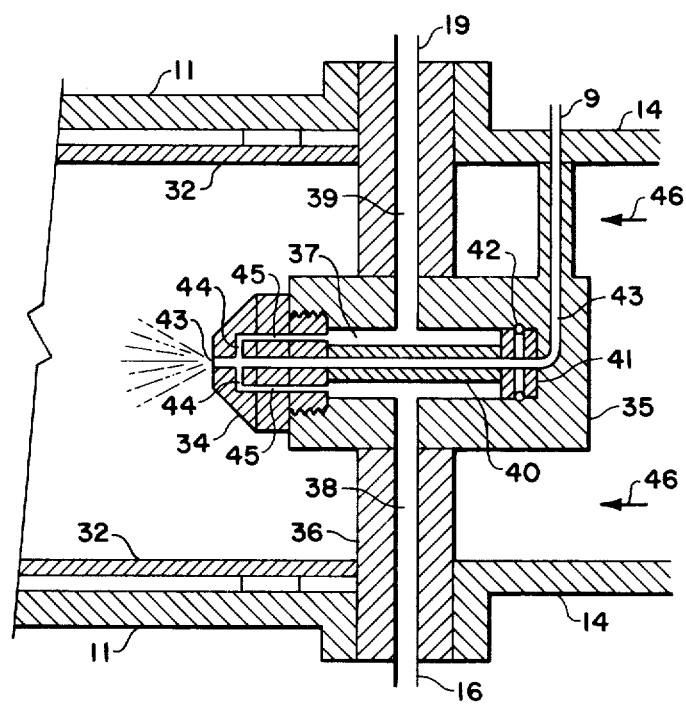
FIG. 3 is an enlarged longitudinal sectional view of the fuel atomizing nozzle of FIG. 2.

FIG. 3 is an enlarged longitudinal section of the fuel spray nozzle and nozzle body of FIG. 2 and parts corresponding thereto are identified by like numerals. The nozzle body 35 is disposed in the end wall 36 of burner chamber 11 substantially coaxial therewith. A chamber 37 is provided in nozzle body 35 and communicates with fuel input line 16 and fuel return line 19 by means of respective passageways 38 and 39 provided in the end wall 36. The nozzle 34 is threaded into the nozzle body 35 and includes an extension 40 and an enlarged end portion 41 which is of slightly smaller diameter than the chamber 37. A rubber O-ring 42 is provided on enlarged portion 41 to seal the COM fuel in chamber 37. A passageway 43 extends coaxially through nozzle 34, extension 40 and enlarged portion 41 and continues through the nozzle body 35 to communicate with the regulated air pressure line 9. The fuel to be atomized by nozzle 34 is directed to the regulared air pressure passageway 43 by means of one or more radially extending passageways which communicate through respective axial passageways 45 with the chamber 37. Thus, as the fuel is delivered to regulated pressure passageway 43, the regulated air pressure sprays it out of the nozzle 34 orifice with a high degree of atomization.

While the air passing through passageway 43 atomizes the fuel, it is insufficient for complete combustion. Accordingly, additional preheated air, as represented by arrows 46, is directed through air delivery tube 14 past nozzle 34 into the burner section 11. The fuel air mixture once ignited, as by the igniters 33, continues to burn with a stable flame. It will be understood that the wall 36 is not solid but contains sufficient open areas to allow the admission of the preheated air into the burner section 11.

Figure 4:
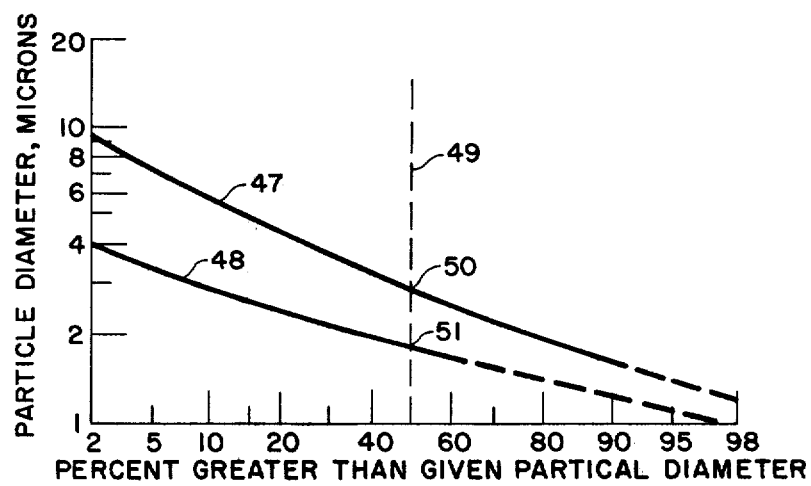
FIG. 4 is a graph illustrating the preferred distribution in size of the coal particles in the coal and oil mixture.

The particle size distribution of coal particles in the (COM) fuel is illustrated in FIG. 4. Curve 47 is based on volume while curve 48 has a numerical basis. At the median point which is indicated by the dashed line 49, the particle size for curve 47 is 2.8 microns, as indicated at 50, while the particle size for curve 48 is 1.8 microns, as indicated at 51.

With regard to FIG. 4, a typical COM fuel is comprised of about 40 weight percent coal, 60 weight percent No. 2 fuel oil, and 3 weight percent of coal lecithin defloculent. Clearly, the percentage of coal and fuel oil must be adjusted so that the total weight percent is no more than 100.

With the burner system described above, the ash resulting from burning the COM fuel consists of submicron size particles. Such particles have very low inertia and, consequently, cause minimum erosion with regard to surfaces such as turbine blades on which the combustion flame would impinge.

The burner unit 10 of FIG. 1 is characterized as operating at a pressure of about 1 psi gage pressure to produce 0.3 Mach with a sonic fuel nozzle 34. The preheated air delivered through tube 14 to the burner section 11 is preferably about 370° C., but may range from about 300° C. to 450° C. The preheated combustion air mixes with the atomized fuel in the sonic nozzle area.

Preheated air from supply 22 is dropped from about 85 psi gage pressure in the supply to between 1 and 1.5 psi in delivery tube 14. Also, the regulated air from supply 20 is provided at 30 to 60 psi gage pressure to passageway 43 of fuel nozzle 34 in FIG. 2. Preferred pressure of the regulated air is about 45 psi gage pressure. The pressure in line 19 after valve 7 is very low and may be on the order of 0.05 to 0.5 psi gage pressure.

With the burner system described above, the COM helps to cool the burner while the COM flow is sufficient to avoid agglomeration of the coal particles.

It will be understood that changes and modifications may be made to the above described invention by those skilled in the art without departing from the spirit and scope of the invention as set forth in the claims appended hereto.

What is claimed is:

1. In a system for burning a coal-in-oil fuel mixture (COM) to provide a flame which produces substantially only submicron ash particles, the combination of:
   a burner unit comprising:
   a cylindrical burner section having first and second ends and a cylindrical inner surface;
   a flame exit nozzle disposed at said first end of said burner section, said nozzle having a throat whose diameter is substantially less than the diameter of the inner surface of said burner section;
   a sonic fuel spray nozzle disposed in said burner section just inwardly of said second end and having a longitudinal passageway extending therethrough to a nozzle orifice, one or more passageways extending radially outwardly from said longitudinal passageway adjacent said nozzle orifice;
   an ignitor extending into said burner section;
   means for delivering air heated to at least 300° C. to said burner section at a pressure greater than 1 psi gage;
   means for supplying fuel at a prescribed pressure to said one or more radial passageways in said nozzle; and
   means for supplying regulated air pressure to said longitudinal passageway whereby said fuel is atomized at said nozzle orifice, combustion in said burner section occurring at about 1 psi gage;
   said means for supplying fuel at a prescribed pressure to said one or more radial passageways in said spray nozzle comprising,
   a fuel supply source;
   a fuel return line communicating said one or more radial passageways with said fuel supply source;
   a fuel delivery line communicating said radial passageways through a fuel control valve and a pump to said fuel supply means;
   pressure relief regulator means connected from said fuel return line to a point in said fuel delivery line between said pump and said control valve whereby two paths are provided for return of excess fuel to said supply source.

2. The system of claim 1 wherein said fuel supply is in a closed drum and including means for pressurizing the drum with an inert gas at a pressure of about 1 psi gage pressure.

3. The system of claim 2 wherein said inert gas is nitrogen.

4. The system of claim 1 wherein said burner section is comprised of inner and outer spaced-apart walls.

5. The system of claim 1 wherein said regulated air pressure is in a range of from 30 to 60 pounds per square inch gage pressure in said longitudinal passageway.

6. The system of claim 5 wherein said regulated air pressure is at a pressure of about 45 pounds per square inch gage pressure.

7. The system of claim 1 wherein said fuel is supplied to said spray nozzle at a pressure of from 10 to 60 pounds per square inch gage pressure.

8. The system of claim 7 wherein the fuel pressure is about 15 pounds per square inch gage pressure.

9. The system of claim 1 wherein said pressure relief regulator means comprises a regulator valve of the type having a control signal input, said input being subjected to a gas at a prescribed pressure whereby the pressure in said fuel delivery line is maintained at the same pressure as said gas.

* * * * *